March 4, 1930. A. LANDRY Re. 17,608

KNITTING MACHINE

Original Filed July 19, 1915 3 Sheets-Sheet 1

March 4, 1930. A. LANDRY Re. 17,608

KNITTING MACHINE

Original Filed July 19, 1915 3 Sheets-Sheet 2

Inventor
Alder Landry
By James H. Thurston,
Attorney.

March 4, 1930. A. LANDRY Re. 17,608

KNITTING MACHINE

Original Filed July 19, 1915 3 Sheets-Sheet 3

Inventor
Aldei Landry
By James H. Thurston,
Attorney.

Reissued Mar. 4, 1930

Re. 17,608

UNITED STATES PATENT OFFICE

ALDEI LANDRY, OF CENTRAL FALLS, RHODE ISLAND, ASSIGNOR, BY MESNE ASSIGNMENTS, TO HEMPHILL COMPANY, A CORPORATION OF MASSACHUSETTS

KNITTING MACHINE

Original No. 1,169,655, dated January 25, 1916, Serial No. 40,718, filed July 19, 1915. Application for reissue filed January 23, 1918. Serial No. 213,413.

The invention relates to striping mechanism for knitting machines, and I have shown the invention in connection with a machine of the Banner type, in which a rotary pattern drum controls the various functions of the machine.

It is one object of my invention to preserve the form and general combination and functioning of parts heretofore used in the Banner machine, and to provide in connection with the well known parts of the Banner machine a simple form of striping mechanism.

The invention consists in the features of construction and arrangement and combination of parts hereinafter described and particularly pointed out in the appended claims.

In the drawings Figure 1 is a front view of a Banner knitting machine embodying my invention;

Figure 2:
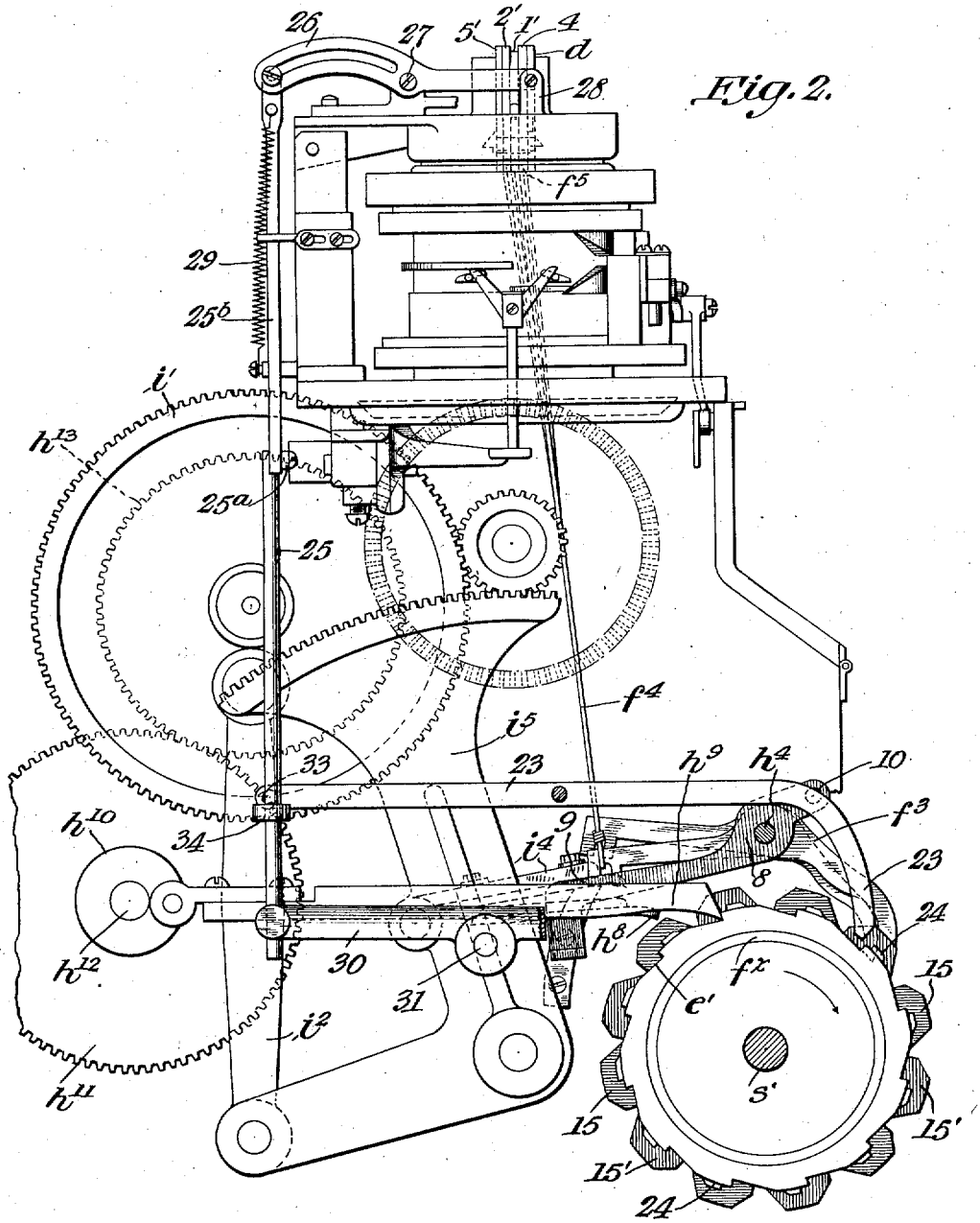
Fig. 2 is a side view with parts of the framework omitted to show the operating parts.

In carrying out my invention, I employ a group of yarn fingers shown generally at $d'$, as is common in the Banner machine built under U. S. Patent 933,443, September 7, 1909, these yarn fingers being controlled from levers marked as a group $f^3$ which, in turn, are controlled from the pattern drum $f$. This drum, in the present machine, is divided into two sections, i. e., the main section $f$ and the auxiliary section $f^x$. The main part $f$ is fixed to the shaft $s'$ as in ordinary practice, while the other section $f^x$ is mounted to rotate independently of the main section of the drum. This auxiliary drum in the particular construction shown, as an illustration my invention, is in the form of a ring mounted on a reduced portion of the main drum, as shown in Fig. 2, and it is provided with ratchet teeth $e'$ for its individual operation as hereinafter described.

Figure 3:
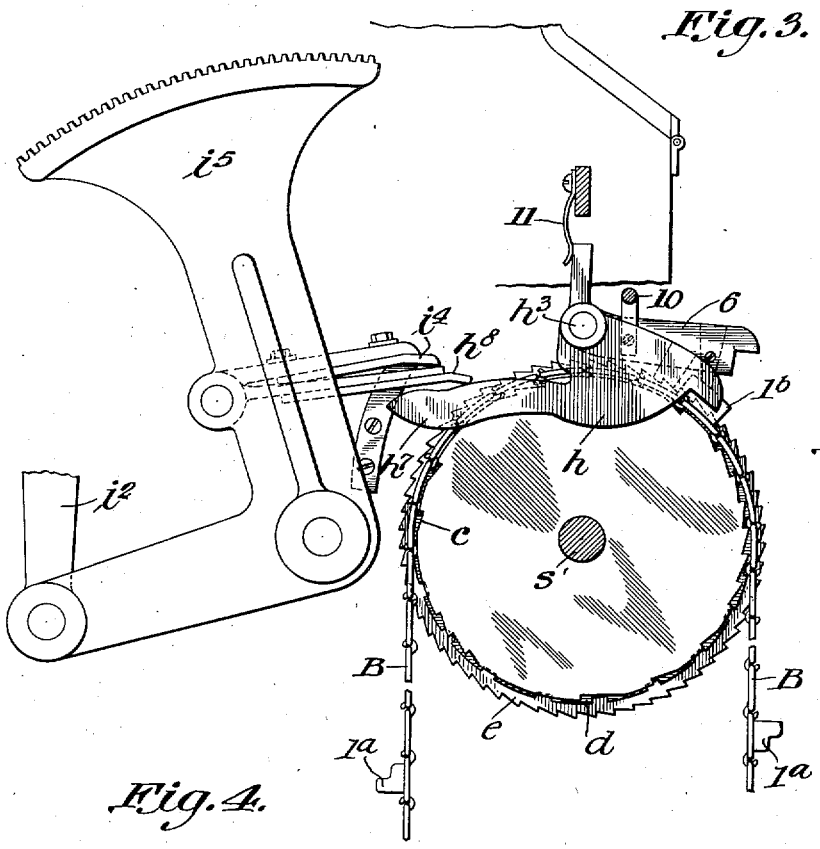
Fig. 3 is a detail view looking from the same direction as in Fig. 2.

The main part of the pattern drum is driven step by step at proper intervals, as determined by the pattern chain B, by a pawl $h^8$, Fig. 3, engaging ratchet teeth $c$ of a disk or wheel fixed on the shaft $s'$ to which the main part $f$ of the drum is connected. This pawl $h^8$ is reciprocated by the arm of the segment $i^5$ common in the Banner machine, said segment being oscillated by pitman $i^2$ driven by the gear $i'$, the said segment imparting the reciprocating rotary movement to the needle cylinder when clutched thereto during heel and toe work.

The times at which the pawl $h^8$ engages the ratchet teeth $c$ for turning the main pattern drum to control various functions of the machine are determined by a controller $h$ pivotally mounted at $h^3$ to the frame, and having a tail portion $h^7$ reaching under the pawl $h^8$ for lifting it out of operation or for lowering the pawl to take more or less of the teeth $c$ and move the drum throughout the desired angle. The controller $h$ is, in turn, controlled by blocks on the pattern chain B, some of said blocks, as an example, being shown at $1^a$.

The pattern chain is mounted alongside the ratchet $e$ on a sprocket wheel $d$, which is driven step by step by a pawl $i^4$ pivotally mounted on the segment arm $i^5$ and reciprocated thereby.

Figure 1:
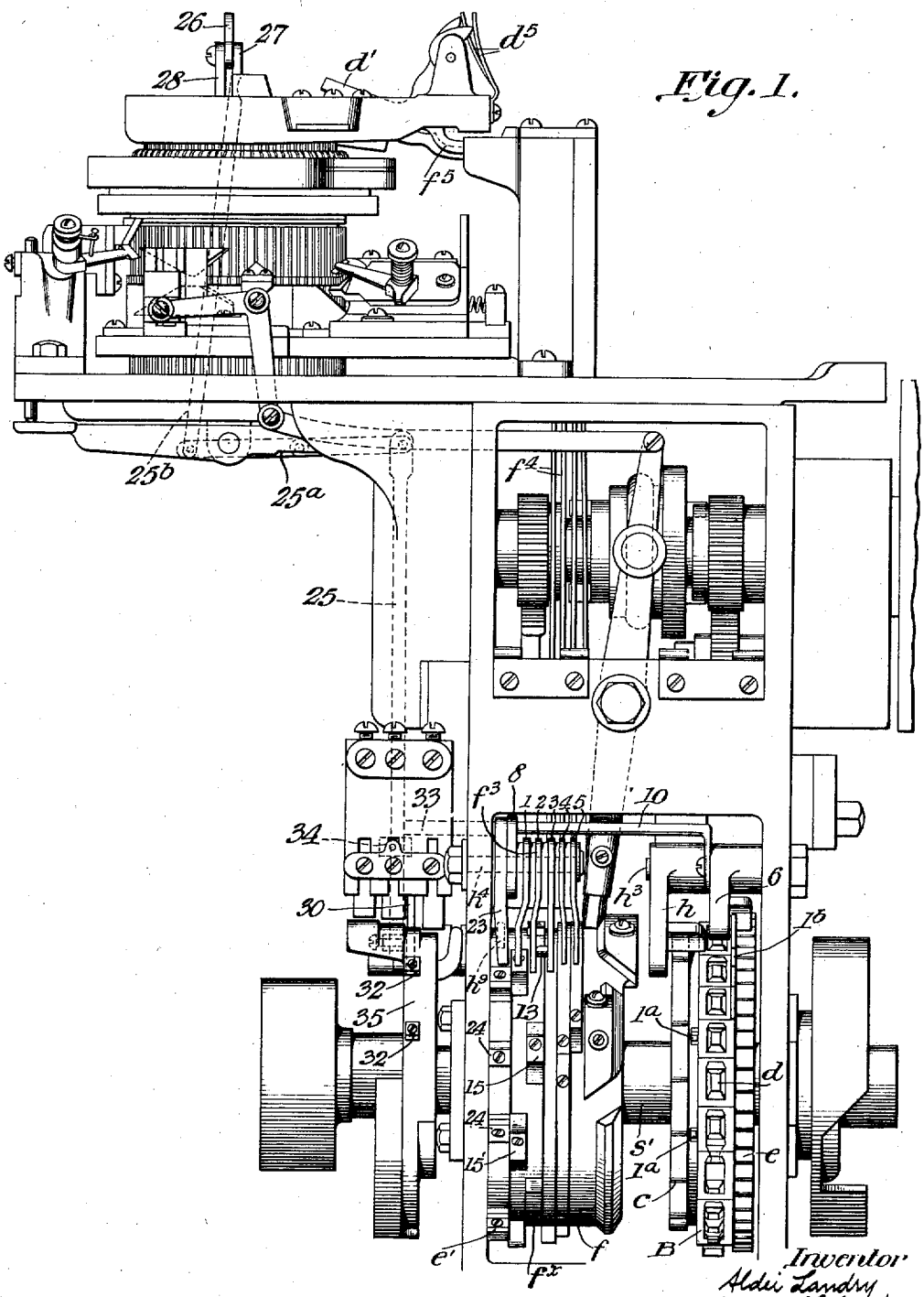

The supplemental drum $f^x$ is driven independently of the main drum $f$, on which I prefer to mount it, by a reciprocating pawl $h^9$ arranged to engage the ratchet teeth $e'$ on said supplemental drum. The pawl $h^9$ is reciprocated by the turning of a crank disk $h^{10}$ on the sleeve or shaft of a gear $h^{11}$, which shaft is mounted on a pin $h^{12}$ supported in the fixed frame. The gear $h^{11}$ is driven from a gear $h^{13}$ fixed to the gear $i'$, the ratio of rotation being such that the crank $h^{10}$ makes one revolution to four revolutions of the needle cylinder, so that for each four revolutions of the needle cylinder the supplemental pattern drum will be turned one step. The time at which the auxiliary pawl $h^9$ will engage and turn the auxiliary drum one step forward is controlled by a supplemental controller 6 pivoted on the same pin $h^3$ on which the main controller $h$ turns. This supplemental controller is raised by blocks at one edge of the pattern chain, as shown at $1^b$, that is to say, the blocks $1^a$ for operating the main controller $h$ are arranged along one side of the chain B, the left side, Fig. 1, while the blocks $1^b$ for the supplemental controller are arranged along the other or right side of the pattern chain. The supplemental controller lies at the right of the machine, Fig. 1, and as its function is to control the pawl $h^9$ lying at the left of the pattern mechanism and in line with the ratchet teeth, I employ a controller arm 8 pivoted on a pin $h^4$ fixed to the frame above the plane of the pawl $h^9$. This arm has an extension 9 with a bent end underlying the pawl $h^9$, and this controller arm is connected with the supplemental controller 6 by a rod 10. Now when the supplemental controller 6 is lifted by one of the blocks as $1^b$ on the pattern chain B, the rod 10 will raise the forward end of the pivoted controller arm 8, thus depressing its rear end and allowing the pawl $h^9$ to fall into line with the teeth $e'$, and thus the supplemental pattern drum or supplemental section of the main pattern drum will be operated step by step independently of the main pattern drum, and these step movements will effect the striping.

The movements of the supplemental drum section $f^x$ may be made in any desired ratio to the revolutions of the needle cylinder. If, for instance, it is moved one step, while in action, for each four revolutions of the needle cylinder, the striping will occur with four courses for each change of yarn, that is, if we are using for striping a red and black yarn, there will be four courses of red and four courses of black throughout the striped portion of the stocking or other fabric. When the pattern chain moves forward so as to remove the pattern block $1^b$ from under the supplemental controller 6, the said controller falls under tension of the spring 11 and the rod 10 lowers the front end of the controller arm 8, lifting its rear end and thus raising the pawl $h^9$ so that the auxiliary drum will remain at rest and striping will cease.

The yarn changing for striping is done through certain of the drum levers of the group $f^3$, which, as in ordinary practice, are connected by wires $f^4$ with levers $f^5$ which lift the yarn fingers $d'$ out of work or permit them to return into work under the action of their springs $d^5$. I have marked these levers of group $f^3$ 1, 2, 3, 4 and 5 and I have also marked the yarn fingers corresponding to the said levers 1′, 2′, 4′ and 5′, that is the drum levers 1, 2, 4, and 5 operate respectively the yarn fingers 1′, 2′, 4″ and 5′, while the dummy lever 3 is coupled to lever 2 by a pin or screw 13 so that the said lever 2 may be lifted to raise its striping yarn finger out of work at the same time that the other striping yarn finger 1′ is lifted to stop striping or for throwing in another yarn.

It will be observed in this connection that the drum lever 2 overlies the surface of the auxiliary drum to be operated by the projections or controlling pattern blocks 15, which alternate with the blocks 15′ which control the other striper lever 1, say, for a red thread, and further it will be seen that the dummy lever 3 overlies the surface of the main pattern drum $f$ to be controlled by pattern blocks thereon, and levers 4 and 5 likewise overlie the surface of the main drum $f$ to be controlled by other pattern blocks on the said drum.

Now as the striping goes on, the levers 1 and 2 will be raised alternately and lowered alternately as the auxiliary drum $f^x$ is turned step by step to bring the pattern blocks 15′ and 15 thereon alternately to and move them past the levers 1 and 2. In view of this alternate action of levers 1 and 2 caused by the blocks 15, 15′, which are alternately positioned, it is necessary to provide the dummy lever 3 to lift out the lever 2 at the same time the lever 1 is up to thus provide for the introduction of another yarn, and therefore the lever 3 is arranged to be operated by the main pattern drum so that both levers 1 and 2 can be lifted and the yarns controlled thereby will be out of work at the same time while knitting is continued by another yarn.

Figure 4:
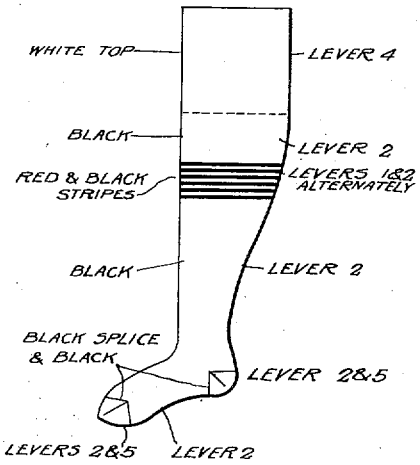
Fig. 4 is a view by way of example of a stocking produced on my machine.

Suppose, for instance, it is desired to knit a stocking such as shown in Fig. 4 with a white garter top below which there is a solid black portion of the fabric, and below this there are black and red stripes, then a black portion at the ankle, a reinforced black heel, the foot in black and a reinforced black toe.

The yarns could be disposed in various ways, but as an example yarn finger 1′ would have red yarn, finger 2′ black yarn, 4′ would have white yarn, and 5′ black splicing yarn. Lever 4 being down on the drum $f$, the white yarn would be in first, all other yarns being out of work. After the white garter top is knit, the main drum is given a one-step movement to allow the lever 3, together with the black yarn lever 2, to drop and bring the black yarn into use, and the same movement of the main drum raises lever 4 and places the white yarn out of work. The red yarn is out of work because lever 1 remains up on one of the cam blocks 15′ of the auxiliary drum $f^x$, this drum remaining at rest. The calf of the leg will now be knit in black, and this will continue until the striping is to be done, when the auxiliary drum will be given a one-step movement which will lift the black thread lever 2 and lower the red thread lever 1, and then the auxiliary pattern drum will be moved step by step at the predetermined intervals in respect to the revolution of the machine to take out the red yarn and put in work the black yarn, and vice versa for striping the fabric in red and black. When striping is to cease, the movement of the auxiliary drum is stopped by the fall of the controller 6 due to the pattern chain removing the block thereon from under said controller, and the auxiliary drum now stops with the black yarn in work and the knitting goes on down to the heel with the black thread, and this yarn remains in during the knitting of the heel, foot and toe, but when the heel is reached a black splicing yarn is thrown in by lowering the yarn finger 5′ through the lever 5 and this yarn is also thrown in for making the toe.

Figure 6:
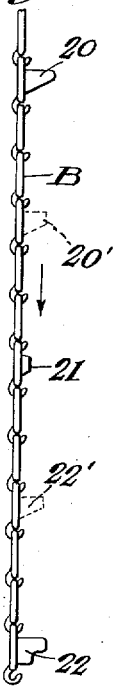
Fig. 6 is a view of a portion of the pattern chain.
Figure 5:
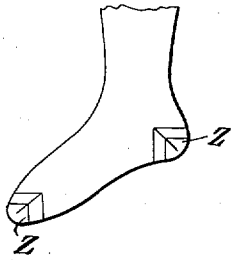
Fig. 5 is a similar view of a portion of a stocking having a tipped heel and toe.

Now, if it is desired to tip the heel and toe with red, as shown in Fig. 5 at *z*, *z*, a section of pattern chain B is used as shown in Fig. 6, in which the lugs 20, 21, and 22 are on the left hand side of the chain for operating the controller *h*, while the blocks 20′, 22′, are on the right hand side of the chain for controlling the auxiliary controller 6. Narrowing will begin with the black yarn at the block 22, and continue the narrowing until it is half completed, when the lug 22′ will bring in the red yarn, and this will continue to the middle of the heel at lug 21, and then widening will begin, the red thread being continued in action to the lug 20′ when the black yarn will come into action and the red yarn will be taken out and thus the heel widenings will be completed in black.

For operating the thread clamp or binder and the cutter within the needle circle in changing the yarns, I employ the same binder and cutter as is common in the Hemphill machine, and in order to operate these parts when the striping is being done, I employ a lever 23 pivoted to the frame and having its front end in the range of projections 24 on the ratchet teeth *e*′ of the supplemental drum, so that at each movement of the supplemental drum this lever will operate to pull down the rod 25 which operates the clamp to hold the yarn which is withdrawn from work and to operate the cutter.

This rod 25 operates through a lever $25^a$ and link $25^b$ a slotted lever 26 pivoted at 27 and having a link connection at 28 with the clamp and cutter mechanism (not shown). The rod $25^b$, is under tension of the spring 29. The rod 25 is connected with a lever 30 at its lower end, which is pivoted to the frame at 31, and is operated from a cam 35 on the shaft *s*′ which has pattern blocks 32 thereon. This pattern wheel 35 and its lever 30 operates the binder or clamp, together with the cutter at all yarn changes excepting when striping is being done, at which time the binder and cutter are operated by the lever 23. This lever has a pin at 33 which overlies a collar 34 on the rod 25, so that the lever 23 will operate the rod 25 to control the binder and cutter, but this connection will not interfere with the operation of the binder and cutter mechanism from the regular lever 30 and cam wheel on shaft *s*′ before mentioned.

In effect my invention comprises a pattern drum of the Hemphill or Banner type, which is split into two sections, said sections being arranged next to each other on the cam shaft and occupying no more space substantially than does the ordinary pattern drum of the Banner machine and the location of this split pattern drum is the same as that of the well known pattern drum of the said Banner machine, my object being to accomplish the result with as little change in this universally accepted type or design of machine. I therefore split the Banner pattern drum into the two sections *f*, and $f^x$ and I control the pawl and ratchet mechanism of the supplemental section of the split pattern drum from the same pattern chain B through which control of the main pattern drum is derived and in order to utilize this chain for the control of both sections of the split pattern drum, I utilize the ordinary Banner controller *h* and I employ a second controller 6 and the latter I connect by an arm 10, which reaches across the main section *f* of the split pattern drum to the controller arm H, which is arranged adjacent the pawl $h^9$ at the opposite end of the pattern mechanism from that at which the main pattern chain B is located.

It will be seen that by the use of the dummy lever 3 operated by the main pattern drum *f* and connected to lever 2 by pin 13, I am enabled to employ one or more yarns different from and in addition to the two striping yarns.

What I claim as my invention and desire to secure by Letters Patent is:—

1. In combination in a knitting machine a series of yarn fingers movable to and from position for feeding yarn to the needles, a split pattern drum, the sections of which are located next to each other and coaxially, levers overlying the periphery of the sections of the split pattern drum, connections extending upwardly from said levers for controlling the yarn fingers, a timing or pattern chain arranged coaxially with the split pattern drum and on the side thereof opposite that upon which the supplemental section is located, means for operating the said pattern chain, a main and a supplemental controller operated from blocks on said pattern chain, a pawl and ratchet mechanism for the main section of the split pattern drum and a pawl and ratchet mechanism for the supplemental section of the split pattern drum, said pawl and ratchet mechanisms being controlled respectively from the main and supplemental controller and said supplemental controller having a connection extending therefrom past the main section of the split pattern drum to control the pawl of the supplemental section, substantially as described.

2. In combination a series of yarn fingers, a main pattern drum, a supplemental pattern drum coaxially arranged with the main pattern drum, a pair of levers controlled by the supplemental pattern drum in alternation whereby one yarn is in work while the other yarn is out, and vice versa, and a third lever connected to one of the levers first mentioned whereby said lever may be put out of work at the same time that the other lever of the pair first mentioned is out of work, and a lever also controlled by the main pattern drum and connected to one of the yarn fingers for operating the same, substantially as described.

3. In combination a plurality of yarn fingers, a plurality of levers controlling said yarn fingers, a main and a supplemental pattern drum arranged side by side and coaxially, pawl and ratchet means for each pattern drum, a pivotally mounted controller arm for the pawl of the supplemental pattern drum, a main controller for the pawl of the main pattern drum, a supplemental controller connected with the controller arm for the pawl of the supplemental pattern drum, a pattern chain carrying two series of blocks for operating the main and supplemental controller, a ratchet, for moving the pattern chain step by step, a pawl for operating the said ratchet, an oscillating segment for imparting rotary reciprocating movements to the movable member of the knitting head, the said segment carrying the pawl for operating the main pattern drum, and carrying the pawl for operating the ratchet of the pattern chain, a gear, a pitman conection between said gear and the oscillating segment, a crank disk connected with the pawl of the supplemental pattern drum, and gearing between the said crank disk and the gear first mentioned for driving the same, substantially as described.

4. In combination a plurality of yarn fingers, a main and supplemental pattern drum arranged side by side and coaxially, pawl and ratchet means for operating each of the drums, connections between the drums and the yarn fingers for controlling the latter, a pattern chain, a main and a supplemental controller operated by said pattern chain for controlling respectively the pawl of the main drum and the pawl of the supplemental drum, connections for operating the thread binder and cutter within the needle circle, said connections being operated from the supplemental drum, and cam means coaxially arranged with the main and supplemental drums for also operating the said connections, substantially as described.

5. In combination a plurality of yarn fingers, a main pattern drum, a supplemental pattern drum arranged coaxially with the main drum, a plurality of levers connected with the yarn fingers, certain of said levers being operated by the main pattern drum, and certain of said levers by the supplemental pattern drum, a pattern chain, means for operating the main and supplemental pattern drums independently, controlling means for timing the operation of the main and supplemental pattern drums, said supplemental pattern drums, when in operation, moving step by step and throwing one yarn finger in and the other out of work, and vice versa, and connections operated from the supplemental pattern drum for controlling the yarn end which is out of work, and means also controlling said connections and timed to operate with the main pattern drum for controlling the yarn end of any yarn fingers thrown out of operation by said main drum, substantially as described.

6. A circular knitting machine, having in combination, two striping yarn fingers, a main pattern drum, an auxiliary pattern drum, a pair of striping yarn levers controlled by said auxiliary pattern drum, and a dummy lever connected to one of said striping yarn levers and controlled by said main pattern drum.

7. A circular knitting machine, having in combination, two striping yarn fingers, a main pattern drum, an auxiliary pattern drum, a pair of striping yarn levers controlled by said auxiliary pattern drum in alternation whereby one yarn is at work while the other yarn is out, and vice versa, a dummy lever connected to one of said striping yarn levers and controlled by the main pattern drum to move one of said striping levers out of operative position, and a lever whereby a main yarn is controlled by said main pattern drum to move said lever into operative position when both of the striping levers are moved out of operative position.

8. A circular knitting machine having, in combination, a series of co-axially mounted yarn fingers including two striping yarn fingers, a main pattern drum, an auxiliary pattern drum, means for operating said two pattern drums, a plurality of striping yarn levers controlled by said auxiliary pattern drum, a plurality of yarn levers controlled by said main pattern drum, and interconnecting means between a yarn lever controlled by one drum and a yarn lever controlled by the other drum.

9. A circular knitting machine having in combination, a series of co-axially mounted yarn fingers including two striping yarn fingers, a main pattern drum, and an auxiliary pattern drum co-axially mounted in proximity, means for operating said two pattern drums, one or more striping yarn levers controlled by the auxiliary pattern drum, one or more yarn levers controlled by the main pattern drum, and operative connections between a yarn lever controlled by one drum and a yarn lever controlled by the other drum.

In testimony whereof, I affix my signature.

ALDEI LANDRY.